(12) United States Patent
Li et al.

(10) Patent No.: US 12,250,371 B2
(45) Date of Patent: *Mar. 11, 2025

(54) INTRA PREDICTION METHOD AND APPARATUS IN IMAGE CODING SYSTEM

(71) Applicant: LG ELECTRONICS INC., Seoul (KR)

(72) Inventors: Ling Li, Seoul (KR); Seunghwan Kim, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,895

(22) Filed: Dec. 6, 2023

(65) Prior Publication Data

US 2024/0107010 A1 Mar. 28, 2024

Related U.S. Application Data

(63) Continuation of application No. 17/964,368, filed on Oct. 12, 2022, now Pat. No. 11,889,068, which is a continuation of application No. 17/279,459, filed as application No. PCT/KR2019/011302 on Sep. 3, 2019, now Pat. No. 11,509,891.

(60) Provisional application No. 62/755,554, filed on Nov. 4, 2018.

(51) Int. Cl.
*H04N 19/11* (2014.01)
*H04N 19/105* (2014.01)
*H04N 19/159* (2014.01)
*H04N 19/176* (2014.01)
*H04N 19/46* (2014.01)

(52) U.S. Cl.
CPC .......... *H04N 19/11* (2014.11); *H04N 19/105* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

2022/0086426 A1* 3/2022 Lee ...................... H04N 19/105

* cited by examiner

*Primary Examiner* — Chikaodili E Anyikire
(74) *Attorney, Agent, or Firm* — Bryan Cave Leighton Paisner LLP

(57) ABSTRACT

An image decoding method performed by a decoding apparatus according to the present disclosure comprises the steps of: obtaining a reference sample line index of a current block and most probable mode (MPM)-related information; constructing an alternative MPM list on the basis of the reference sample line index; deriving an intra prediction mode of the current block on the basis of the alternative MPM list and the MPM-related information; and generating a predicted block of the current block on the basis of the intra prediction mode, wherein the alternative MPM list is constructed on the basis of an intra prediction mode of an upper adjacent block of the current block and an intra prediction mode of a left adjacent block of the current block.

3 Claims, 11 Drawing Sheets

INTRA PREDICTION METHOD AND APPARATUS IN IMAGE CODING SYSTEM

CROSS-REFERENCE TO RELATED APPLICATIONS

This application is a continuation application of U.S. patent application Ser. No. 17/964,368, filed on Oct. 12, 2022, which is a continuation of U.S. patent application Ser. No. 17/279,459, filed on Mar. 24, 2021 (now U.S. Pat. No. 11,509,891, issued on Nov. 22, 2022), which is a National Stage Entry of International Application No. PCT/KR2019/011302, filed on Sep. 3, 2019, which claims the benefit of U.S. Provisional Application No. 62/755,554, filed on Nov. 4, 2018, the contents of which are all hereby incorporated by reference herein in their entirety.

BACKGROUND OF THE DISCLOSURE

Field of the Disclosure

The present disclosure relates to an image coding technology, and more specifically, to a method and an apparatus for intra prediction in an image coding system.

Related Art

Demands for high-resolution and high-quality images, such as High Definition (HD) images and Ultra High Definition (UHD) images, have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An aspect of the present disclosure is to provide a method and an apparatus for enhancing image coding efficiency.

Another aspect of the present disclosure is to provide a method and an apparatus for efficient intra prediction.

Still another aspect of the present disclosure is to provide a method and an apparatus for efficiently configuring an MPM list in multi-reference line (MRL) intra prediction.

According to an exemplary embodiment of the present disclosure, an image decoding method performed by a decoding apparatus is provided. The method includes: obtaining reference sample line index and most probable mode (MPM) related information of a current block; configuring an alternative MPM list based on the reference sample line index; deriving an intra prediction mode of the current block based on the alternative MPM list and the MPM related information; and generating a predicted block for the current block based on the intra prediction mode, wherein the alternative MPM list is configured based on an intra prediction mode of a top neighboring block of the current block and an intra prediction mode of a left neighboring block of the current block.

According to another exemplary embodiment of the present disclosure, a decoding apparatus for performing an image decoding is provided. The decoding apparatus includes: an entropy decoder configured to obtain reference sample line index and most probable mode (MPM) related information of a current block; and a predictor configured to: configure an alternative MPM list based on the reference sample line index, derive an intra prediction mode of the current block based on the alternative MPM list and the MPM related information, and generate a predicted block for the current block based on the intra prediction mode, wherein the alternative MPM list is configured based on an intra prediction mode of a top neighboring block of the current block and an intra prediction mode of a left neighboring block of the current block.

According to still another exemplary embodiment of the present disclosure, a video encoding method performed by an encoding apparatus is provided. The method includes: deriving a reference sample line index of a current block; configuring an alternative most probable mode (MPM) list based on the reference sample line index; deriving an intra prediction mode of the current block based on the alternative MPM list; deriving MPM related information of the current block; generating a predicted block for the current block based on the intra prediction mode; and encoding and outputting image information including the reference sample line index and the MPM related information, wherein the alternative MPM list is configured based on an intra prediction mode of a top neighboring block of the current block and an intra prediction mode of a left neighboring block of the current block.

According to yet still another exemplary embodiment of the present disclosure, a video encoding apparatus is provided. The encoding apparatus includes: a predictor configured to: derive a reference sample line index of a current block, configure an alternative most probable mode (MPM) list based on the reference sample line index, derive an intra prediction mode of the current block based on the alternative MPM list, derive MPM related information of the current block, and generate a predicted block for the current block based on the intra prediction mode; and an entropy encoder configured to encode and output image information including the reference sample line index and the MPM related information, wherein the alternative MPM list is configured based on an intra prediction mode of a top neighboring block of the current block and an intra prediction mode of a left neighboring block of the current block.

According to the present disclosure, the image compression efficiency can be improved.

According to the present disclosure, the intra prediction mode can be efficiently derived while the arithmetic complexity can be reduced.

DESCRIPTION OF EXEMPLARY EMBODIMENTS

Figure 1:
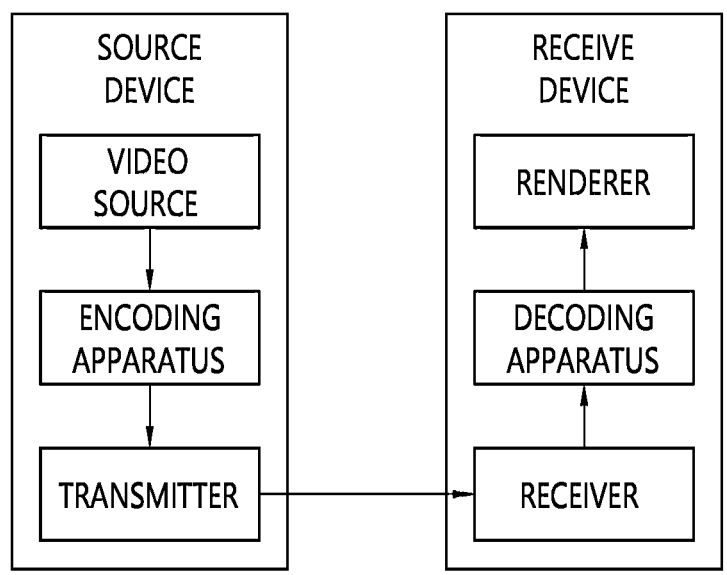
FIG. 1 schematically illustrates an example of a video/image coding system to which the present disclosure is applicable.

According to an exemplary embodiment of the present disclosure, an image decoding method performed by a decoding apparatus is provided. The method includes: deriving a motion vector for one neighbor merge candidate block among neighbor merge candidate blocks of a current block, if a merge mode is applied to the current block, deriving a reference block indicated by the motion vector for the neighbor merge candidate block, in a reference picture, deriving a refinement block in which a sum of absolute differences (SAD) with the current block is the minimum among refinement candidate blocks within a search range of the reference block, if a decoder-side motion vector refinement (DMVR) is applied to the current block, deriving prediction samples for the current block based on a refinement motion vector for the derived refinement block, and generating reconstructed samples for the current block based on the prediction samples.

This disclosure can be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 is schematically illustrating a video/image coding system to which this disclosure may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
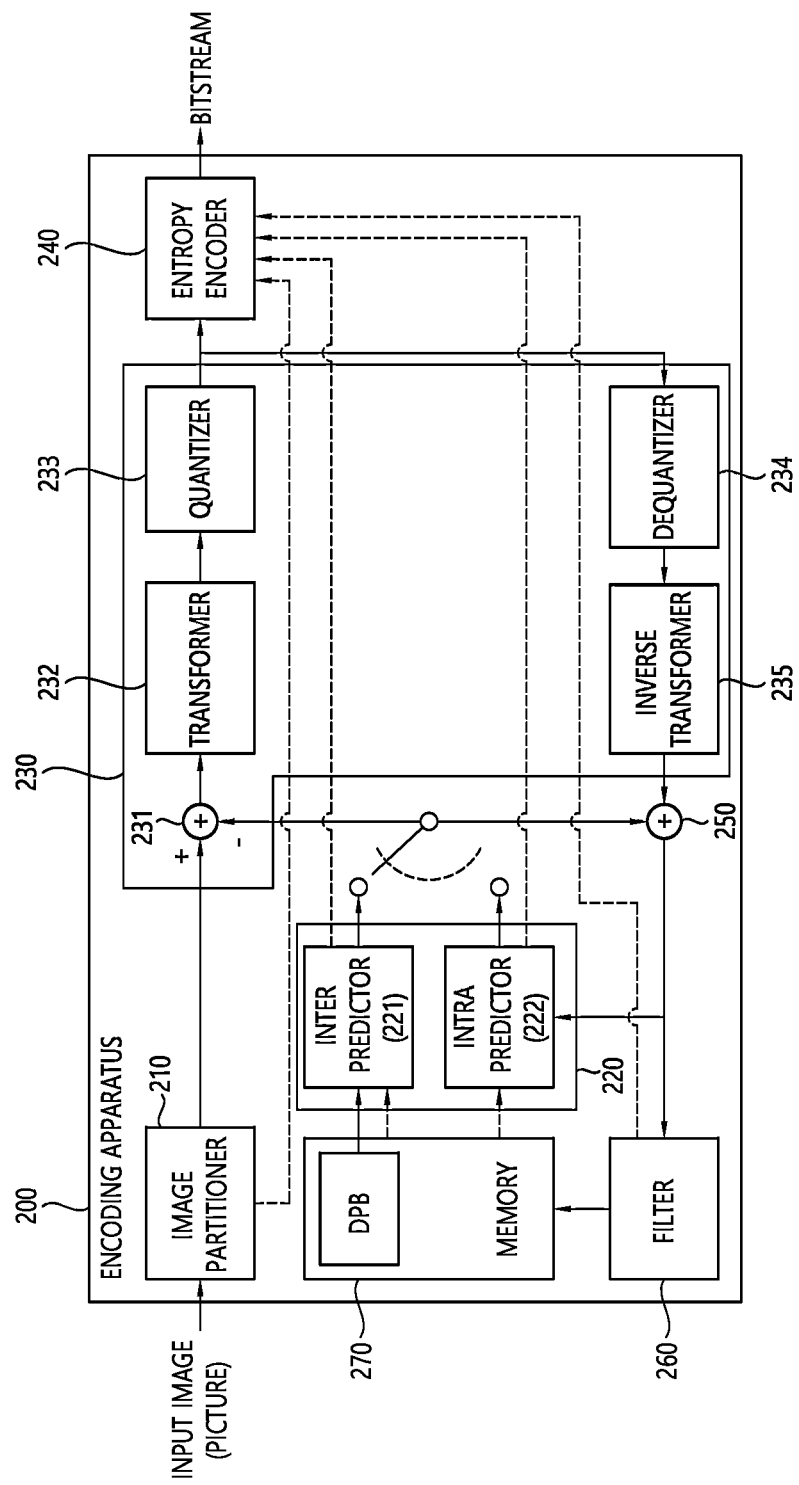
FIG. 2 is a diagram for schematically explaining a configuration of a video/image encoding apparatus to which the present disclosure is applicable.

FIG. 2 is a schematic diagram illustrating a configuration of a video/image encoding apparatus to which the embodiments of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment.

In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal.

For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
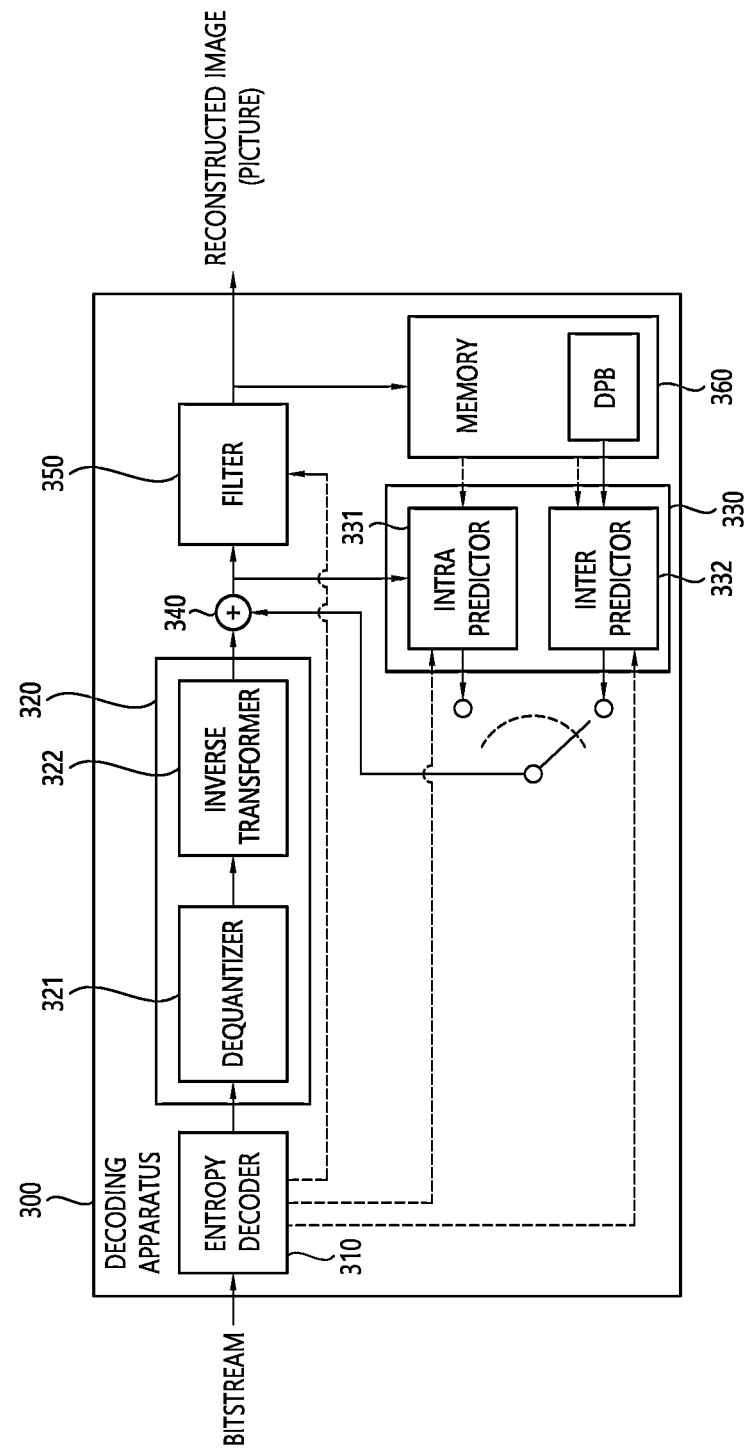
FIG. 3 is a diagram for schematically explaining a configuration of a video/image decoding apparatus to which the present disclosure is applicable.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Dream Intra prediction may represent prediction generating prediction samples for the current block based on reference samples in a picture (hereinafter, current picture) to which the current block belongs. When the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to a top boundary of the current block, total 2×nW samples neighboring the top-right, and one sample neighboring the top-left of the current block. Further, the neighboring reference samples of the current block may also include top neighboring samples of a plurality of columns and left neighboring samples of a plurality of rows. Further, the neighboring reference samples of the current block may also include total nH samples adjacent to the right boundary of the current block having the size of nW×nH, total nW samples adjacent to a bottom boundary of the current block, and one sample neighboring the bottom-right of the current block.

However, some of the neighboring reference samples of the current block may have not yet been decoded or may be unavailable. In this case, the decoder may configure the neighboring reference samples to be used for the prediction by substituting available samples for unavailable samples. Further, the decoder may configure the neighboring reference samples to be used for the prediction through interpolation of the available samples.

When the neighboring reference samples are derived, (i) a prediction sample may be induced based on an average or interpolation of the neighboring reference samples of the current block, and (ii) the prediction sample may be induced based on the reference sample existing in a specific (prediction) direction with respect to the prediction sample among the neighboring reference samples of the current block. The case (i) may be called a non-directional mode or a non-angular mode, and the case (ii) may be called a directional mode or an angular mode.

Further, the prediction sample may be generated through interpolation between the second neighboring sample located in an opposite direction to the prediction direction of the intra prediction mode of the current block and the first neighboring sample based on the prediction sample of the current block among the neighboring reference samples. The above-described case may be called a linear interpolation intra prediction (LIP). Further, chroma prediction samples may be generated based on luma samples using a linear model. This case may be called an LM mode.

Further, a temporary prediction sample of the current block may be derived based on the filtered neighboring reference samples, and the prediction sample of the current block may be derived by weighted-summing the at least one reference sample derived according to the intra prediction mode among the existing neighboring reference samples, that is, non-filtered neighboring reference samples, and the temporary prediction sample. The above-described case may be called a position dependent intra prediction (PDPC).

Further, a reference sample line having the highest prediction accuracy among neighboring multiple reference sample lines of the current block may be selected, and the prediction sample may be derived from the corresponding line using the reference sample located in the prediction direction. In this case, an intra prediction encoding may be performed as a method for indicating (signaling) the used reference sample line to the decoding apparatus. The above-described case may be called a multi-reference line (MRL) intra prediction or MRL based intra prediction.

Further, the intra prediction may be performed based on the same intra prediction mode by dividing the current block into vertical or horizontal sub-partitions, and the neighboring reference samples may be derived and used in the unit of sub-partition. That is, in this case, the intra prediction mode for the current block is equally applied to the sub-partitions, and the neighboring reference sample is derived and used in the unit of the sub-partition, thereby enhancing the intra prediction performance as needed. Such a prediction method may be called an intra sub-partitions (ISP) or ISP based intra prediction.

The above-described intra prediction methods may be called an intra prediction type separately from the intra prediction mode. The intra prediction type may be called by various wordings, such as intra prediction technique or additional intra prediction mode. For example, the intra prediction type (or additional intra prediction mode and the like) may include at least one of LIP, PDPC, MRL, and ISP described above. A general intra prediction method excluding specific intra prediction type, such as the LIP, PDPC, MRL, and ISP, may be called a normal intra prediction type. The normal intra prediction type may be generally applied in case that the above specific intra prediction type is not applied, and the prediction may be performed based on the above-described intra prediction mode. Meanwhile, post-filtering may be performed on the derived prediction sample as needed.

Specifically, the intra prediction procedure may include an intra prediction mode/type determination step, a neighboring reference sample derivation step, and an intra prediction mode/type based prediction sample derivation step. In addition, a post-filtering step may be performed on the derived prediction sample as needed.

Meanwhile, in addition to the above-described intra prediction types, affine linear weighted intra prediction (ALWIP) may be used. The ALWIP may also be called linear weighted intra prediction (LWIP) or matrix weighted intra prediction or matrix based intra prediction (MIP). In case that the MIP is applied to the current block, i) using neighboring reference samples on which an averaging procedure has been performed, ii) a matrix-vector-multiplication procedure may be performed, and iii) the prediction samples for the current block may be derived by further performing a horizontal/vertical interpolation procedure as needed. The intra prediction modes used for the MIP may be configured differently from the intra prediction modes used for the above-described LIP, PDPC, MRL, or ISP intra prediction or the normal intra prediction. The intra prediction mode for the MIP may be called an MIP intra prediction mode, MIP prediction mode, or MIP mode. For example, according to the intra prediction mode for the MIP, a matrix and an offset used for the matrix vector multiplication may be differently configured. Here, the matrix may be called a (MIP) weight matrix, and the offset may be called a (MIP) offset vector or (MIP) bias vector.

In case that intra prediction is applied, the intra prediction mode that is applied to the current block may be determined using the intra prediction mode of a neighboring block. For example, the decoding apparatus may select one of MPM candidates in the most probable mode (MPM) list, which is derived based on the intra prediction mode of the neighboring blocks (e.g., left and/or top neighboring blocks) of the current block and additional candidate modes, based on the received MPM index, or may select one of the remaining intra prediction modes that are not included in the MPM candidates (and planar mode) based on the remaining intra prediction mode information. The MPM list may be configured to include or not to include the planar mode as the candidate. For example, if the MPM list includes the planar mode as the candidate, the MPM list may have 6 candidates, whereas if the MPM list does not include the planar mode as the candidate, the MPM list may have 3 or 5 candidates. If the MPM list does not include the planar mode as the candidate, a not planar flag (e.g., intra_luma_not_planar_flag) indicating whether the intra prediction mode of the current block is not the planar mode may be signaled. For example, the MPM flag may be first signaled, and the MPM index and the not planar flag may be signaled in case that the MPM flag value is 1. Further, the MPM index may be signaled in case that the not planar flag value is 1. Here, that the MPM list is configured not to include the planar mode as the candidate is to first check the planar mode by first signaling the flag (not planar flag) since the planar mode is always considered as the MPM rather than that the planar mode is not the MPM.

For example, whether the intra prediction mode being applied to the current block is in the MPM candidates (and planar mode) or in the remaining mode may be indicated based on the MPM flag (e.g., intra_luma_mpm_flag). The MPM flag value 1 may represent that the intra prediction mode for the current block is in the MPM candidates (and planar mode), and the MPM flag value 0 may represent that that the intra prediction mode for the current block is not in the MPM candidates (and planar mode). The not planar flag (e.g., intra_luma_not_planar_flag) value 0 may represent that the intra prediction mode for the current block is the planar mode, and the not planar flag value 1 may represent that the intra prediction mode for the current block is not the planar mode. The MPM index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may indicate one of the remaining intra prediction modes which are not included in the MPM candidates (and planar mode) among all the intra prediction modes by indexing the remaining intra prediction modes in the order of prediction mode numbers. The intra prediction mode may be an intra prediction mode for a luma component (sample). Hereinafter, the intra prediction mode information may include at least one of the MPM flag (e.g., intra_luma_mpm_flag), the not planar flag (e.g., intra_luma_not_planar_flag), the MPM index (e.g., mpm_idx or intra_luma_mpm_idx), or the remaining intra prediction mode information (rem_intra_luma_pred_mode or intra_luma_mpm_remainder). In the document, the MPM list may be called as various wordings, such as MPM candidate list, candModeList, and the like. If the MIP is applied to the current block, separate mpm flag (e.g., intra_mip_mpm_flag), mpm index (e.g., intra_mip_mpm_idx), and remaining intra prediction mode information (e.g., intra_mip_mpm_remainder) may be signaled for the MIP, and the not planar flag is not signaled.

In other words, if block partition for an image is generally performed, the current block to be coded and the neighboring block have similar image characteristics. Accordingly, there is a high probability that the current block and the neighboring block have the same or similar intra prediction mode. Accordingly, the encoder may use the intra prediction mode of the neighboring block in order to encode the intra prediction mode of the current block.

For example, the encoder/decoder may configure the most probable mode (MPM) list for the current block. The MPM list may be represented as the MPM candidate list. Here, the term MPM may mean a mode that is used to improve the coding efficiency in consideration of similarity between the current block and the neighboring block during the intra prediction mode coding. As described above, the MPM list may be configured to include the planar mode, or may be configured to exclude the planar mode. For example, if the MPM list includes the planar mode, the number of candidates of the MPM list may be 6. Further, if the MPM list does not include the planar mode, the number of candidates of the MPM list may be 5.

The encoder/decoder may configure the MPM list including 6 MPMs.

In order to configure the MPM list, three kinds of modes of default intra modes, neighbor intra modes, and derived intra modes may be considered.

For the neighbor intra modes, two neighboring blocks, that is, a left neighboring block and a top neighboring block, may be considered.

As described above, if the MPM list is configured not to include the planar mode, the planar mode is excluded from the list, and the number of candidates of the MPM list may be set to 5.

Figure 4:
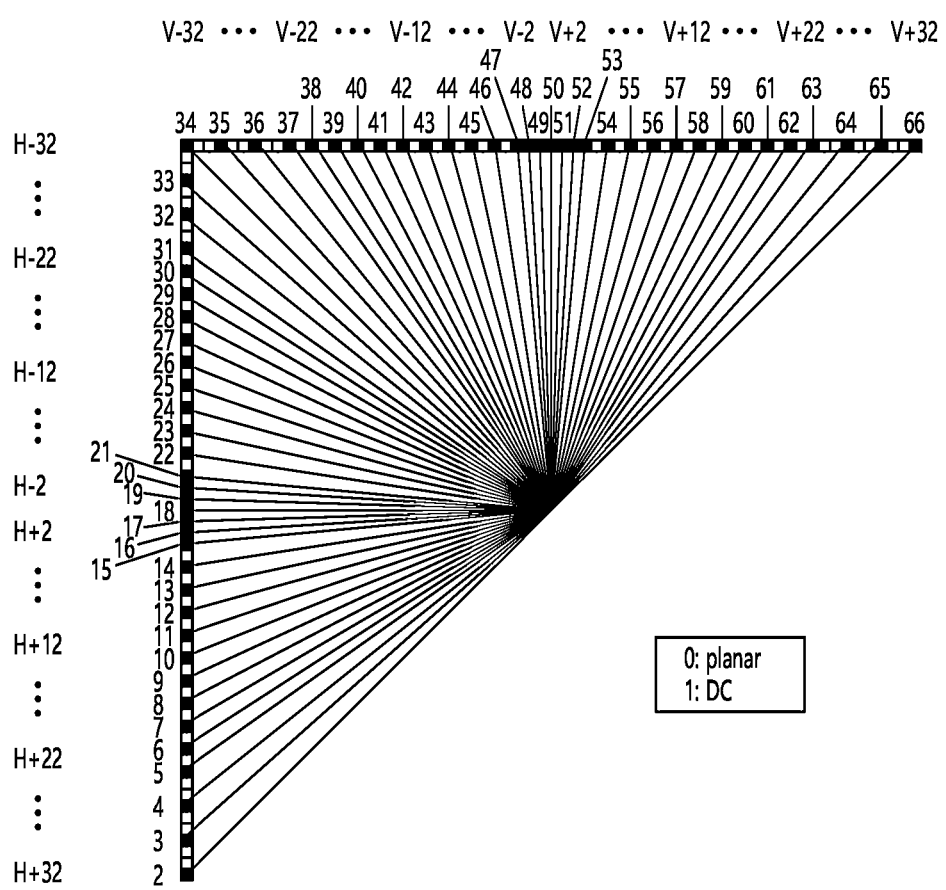
FIG. 4 illustrates an example of 67 intra modes.

FIG. 4 illustrates an example of 67 intra modes.

Referring to FIG. 4, among intra modes, a directional mode or an angular mode may discriminate an intra prediction mode having horizontal directionality and an intra prediction mode having vertical directionality from each other around No. 34 intra prediction mode having top-left diagonal prediction direction. In FIG. 3, H and V mean the horizontal directionality and the vertical directionality, respectively, and numerals of −32 to 32 represent displacements in the unit of 1/32 on a sample grid position. No. 2 to No. 33 intra prediction modes have the horizontal directionality, and No. 34 to No. 66 intra prediction modes have the vertical directionality. No. 18 intra prediction mode and No. 50 intra prediction mode represent a horizontal intra prediction mode and a vertical intra prediction mode, respectively. No. 2 intra prediction mode may be called a bottom-left diagonal intra prediction mode, No. 34 intra prediction mode may be called a top-left diagonal intra prediction mode, and No. 66 intra prediction mode may be called a top-right diagonal intra prediction mode.

Further, the non-directional mode or the non-angular mode may include a DC mode based on the average of the neighboring reference samples of the current block or an interpolation based planar mode.

Meanwhile, in case that the intra prediction is applied to the current block, the intra prediction mode being applied to the current block may be derived based on the intra prediction mode of the neighboring blocks of the current block. For example, the decoding apparatus may derive the most probable mode (MPM) list based on the intra prediction mode of the neighboring blocks (e.g., left neighboring block and/or top neighboring block) of the current block and additional candidate modes, may select one of the MPM candidates in the derived MPM list based on the received MPM index, or may select one of the remaining intra prediction modes that are not included in the MPM candidates based on the remaining intra prediction mode information. Whether the intra prediction mode of the current block exists in the MPM list may be indicated based on the MPM flag. The MPM list may be represented as an intra prediction mode candidate list, or may be represented as candModeList.

Here, the MPM list may include, for example, 3, 5, or 6 MPM candidates. As an example, the MPM list may include derived candidates based on the intra prediction mode of the neighboring block, derived intra prediction mode, and/or default intra prediction mode.

The encoding apparatus/decoding apparatus may search for the neighboring blocks of the current block in a specific order, and may derive the intra prediction mode of the neighboring block in the derived order as the MPM candidate. For example, the neighboring blocks may include a left neighboring block, a top neighboring block, a bottom-left neighboring block, a top-right neighboring block, and a top-left neighboring block, and the encoding apparatus/decoding apparatus may derive the MPM candidate by making a search in the order of the intra prediction mode of the left neighboring block, intra prediction mode of the top neighboring block, planar intra prediction mode, DC intra prediction mode, intra prediction mode of the bottom-left neighboring block, intra prediction mode of the top-right neighboring block, and intra prediction mode of the top-left neighboring block, and may configure the MPM list of the current block. Meanwhile, if 6 MPM candidates are not derived after the search, the MPM candidate may be derived based on the intra prediction mode derived as the MPM candidate. For example, if the intra prediction mode derived as the MPM candidate is No. N intra prediction mode, the encoding apparatus/decoding apparatus may derive No. (N+1) intra prediction mode and/or No. (N−1) intra prediction mode as the MPM candidates of the current block. The details of the neighboring blocks will be described later.

Further, for example, whether the intra prediction mode being applied to the current block is included in the MPM candidates or in the remaining intra prediction modes may be derived based on the MPM flag. Specifically, if the MPM flag value is 1, the MPM flag may indicate that the intra prediction mode of the current block is included in the MPM candidates (MPM list), and if the MPM flag value is 0, the MPM flag may indicate that the intra prediction mode of the current block is not included in the MPM candidates (MPM list), but is included in the remaining intra prediction modes.

Meanwhile, the encoding apparatus may derive the MPM list for the current block based on the intra prediction mode of the neighboring block of the current block and additional candidate modes, determine the intra prediction mode of the current block, and encode the intra prediction mode information for the current block to store and/or transmit the encoded information.

Figure 5:
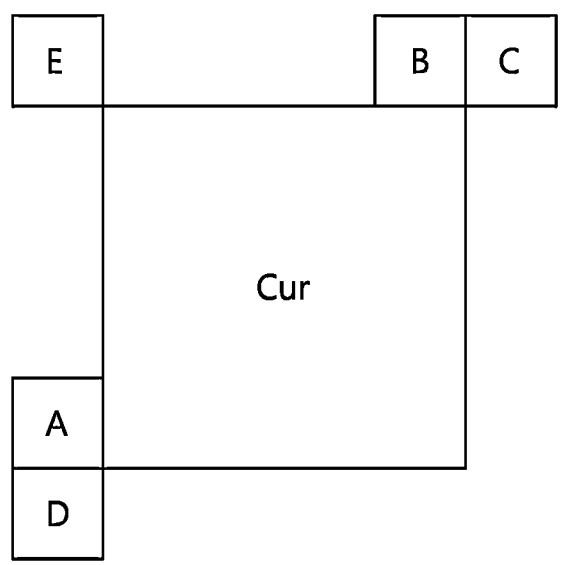
FIG. 5 illustrates an example of a neighboring block for deriving MPM candidates.

FIG. 5 illustrates an example of neighboring blocks for deriving MPM candidates.

Referring to FIG. 5, Cur represents a block intended to be currently coded, that is, the current block. A, B, C, D, and E represent neighboring blocks of the current block. An initial MPM list may be composed of intra modes of 5 neighboring blocks, a planar mode, and a DC mode, and a pruning process may be performed to remove redundant modes in the MPM list. In order to configure the initial MPM list, 5 neighboring blocks may be searched for, and the intra prediction mode neighboring the current block may be derived by searching for the neighboring blocks in the order of the left neighboring block A, top neighboring block B, bottom-left neighboring block D, top-right neighboring block C, and top-left neighboring block E of the current block. In this case, the locations of the neighboring blocks to be searched for and the search order of the neighboring blocks may be predetermined or may be randomly determined. Further, the initial MPM list may be configured in the order of the intra prediction mode of the left neighboring block A, intra prediction mode of the top neighboring block B, planar mode, DC mode, intra prediction mode of the bottom-left neighboring block D, intra prediction mode of the top-right neighboring block C, and intra prediction mode of the top-left neighboring block E.

In an embodiment, the pruning process may be performed with respect to the initial MPM list configured as described above, and redundant MPM candidates may be removed. Accordingly, the number of MPM candidates in the MPM list may become less than 6, and in this case, the derived intra mode may be added to the MPM list.

The above intra mode may be derived as −1 or +1 mode with respect to angular modes included in the MPM list. In this case, if the number of candidate modes becomes 6, the MPM candidate mode determination method is ended. However, if the number of MPM candidates in the MPM list is still less than 6, the default intra mode may be further added. The addition of the default intra modes may be in the order of a vertical intra prediction mode, a horizontal intra prediction mode, and a diagonal intra prediction mode. Here, the diagonal intra prediction mode may indicate No. 34 intra prediction mode. As a result, the MPM list may be composed of 6 MPM candidates or 6 modes, which are unique or non-redundant. Here, in case that the planar mode is included in the MPM list, the number of candidates or modes in the MPM list may be 6, and in case that the planar mode is not included, the number of candidates or modes may be 5, but is not limited thereto.

In an embodiment, the mrl_idx field may be called an (intra) reference sample line index, and may be represented as an intra_luma_ref_idx field or an intra_luma_ref_line_idx field. Further, in case of a luma sample, it may be represented as an intra_luma_ref_idx field or an intra_luma_ref_line_idx field.

The intra_luma_ref_idx field may be represented as intra_luma_ref_idx[x0][y0] in a coding unit (CU) syntax, and for example, the coding unit syntax may be included as in Table 1 below.

TABLE 1

```
coding_unit( x0, y0, cbWidth, cbHeight, treeType ) {
    if( slice_type  !=  I ) {
        cu_skip_flag[ x0 ][ y0 ]
        if( cu_skip_flag[ x0 ][ y0 ] == 0 )
            pred_mode_flag
    }
    if( CuPredMode[ x0 ][ y0 ]  ==  MODE_INTRA ) {
        if( treeType == SINGLE_TREE  ||  treeType == DUAL_TREE_LUMA ) {
            if( ( y0 % CtbSizeY ) > 0 )
                intra_luma_ref_idx[ x0 ][ y0 ]
            if (intra_luma_ref_idx[ x0 ][ y0 ] == 0)
                intra_luma_mpm_flag[ x0 ][ y0 ]
            if( intra_luma_mpm_flag[ x0 ][ y0 ] )
                intra_luma_mpm_idx[ x0 ][ y0 ]
            else
                intra_luma_mpm_remainder[ x0 ][ y0 ]
        }
        ...
    }
}
```

Figure 6:
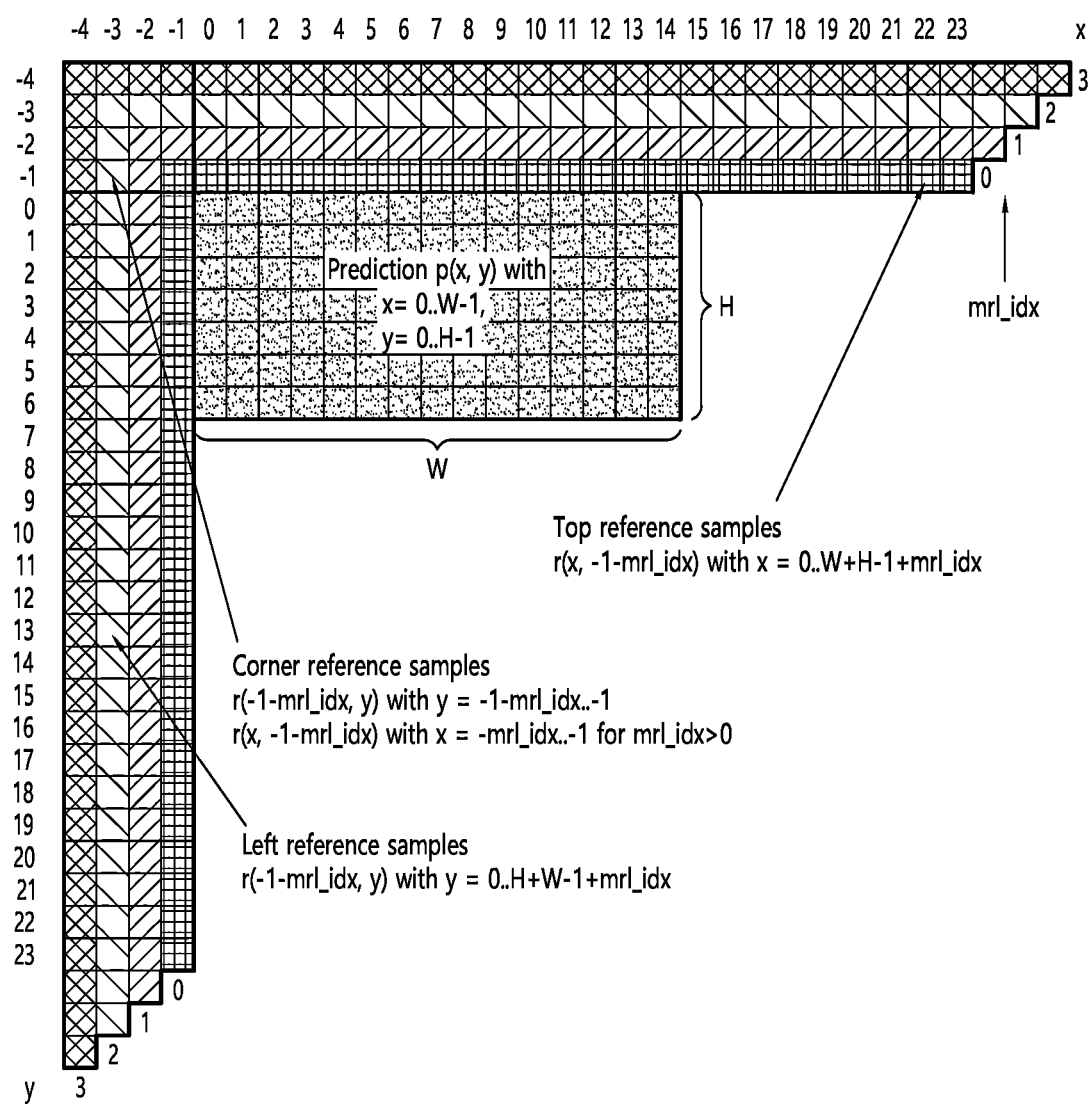
FIG. 6 illustrates an example of a reference sample line for MRL intra prediction.

FIG. 6 illustrates an example of a reference sample line for MRL intra prediction.

The intra prediction in the related art has been performed using direct neighboring samples, that is, immediately adjacent samples, as reference samples for prediction. Multi-reference line intra prediction (MRL) is a method using neighboring samples located in a distance of one or three samples from the left and top of the current prediction block, and can improve prediction accuracy by extending a reference sample selection range as compared with the intra prediction in the related art.

That is, locations of the neighboring samples being used for the intra prediction in the related art may correspond to the neighboring samples located in a distance of zero samples from the current prediction block, and such locations of the neighboring samples may be called line 0. Locations of the reference samples extended according to the MRL may correspond to the neighboring samples located in the distance of one or three samples from the current prediction block, and such locations of the neighboring samples may be called line 1 or line 3.

Referring to FIG. 6, line 0, line 1, line 2, and line 3 may be located in close order from the prediction block, and line 0 may represent the locations of the neighboring samples used in the intra prediction in the related art, and line 1 and line 3 may represent the locations of the neighboring samples extended according to the MRL.

Further, in case of following the MRL, top reference samples, top-left corner reference samples, and left reference samples of the prediction block for the intra prediction may be indicated using an mrl_idx field. Here, the mrl_idx field may indicate lines to be used for the intra prediction of the coding unit. That is, the mrl_idx field value may be 0, 1, and 2, and thus may indicate line 0, line 1 and line 3. Here, line 2 has been excluded, but may also be used according to settings.

In Table 1, the intra_luma_ref_idx[x0][y0] field may indicate the line IntraLumaRefLineIdx[x0][y0] of the reference samples. For example, the line IntraLumaRefLineIdx[x0][y0] of the reference samples being indicated according to the intra_luma_ref_idx[x0][y0] field value may be the same as that in Table 2 below.

TABLE 2

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

In other words, as in Table 2, if the intra_luma_ref_idx[x0][y0] field value is 0, the IntraLumaRefLineIdx[x0] [y0] may be 0 to indicate the zeroth line (line 0), while if the intra_luma_ref_idx[x0] [y0] field value is 2, the IntraLumaRefLineIdx[x0] [y0] may be 3 to indicate the third line (line 3).

For example, the intra_luma_ref_idx[x0][y0] field may not be included in the coding unit syntax, and this case may be the same as the case that the intra_luma_ref_idx[x0][y0] field value is 0. Further, it may imply the case that the field value is 0.

For example, the intra_luma_mpm_flag[x0][y0] field may not be included in the coding unit syntax, and this case may be the same as the case that the intra_luma_mpm_flag[x0] [y0] field value is 1. Further, it may imply the case that the field value is 1.

Figure 7:
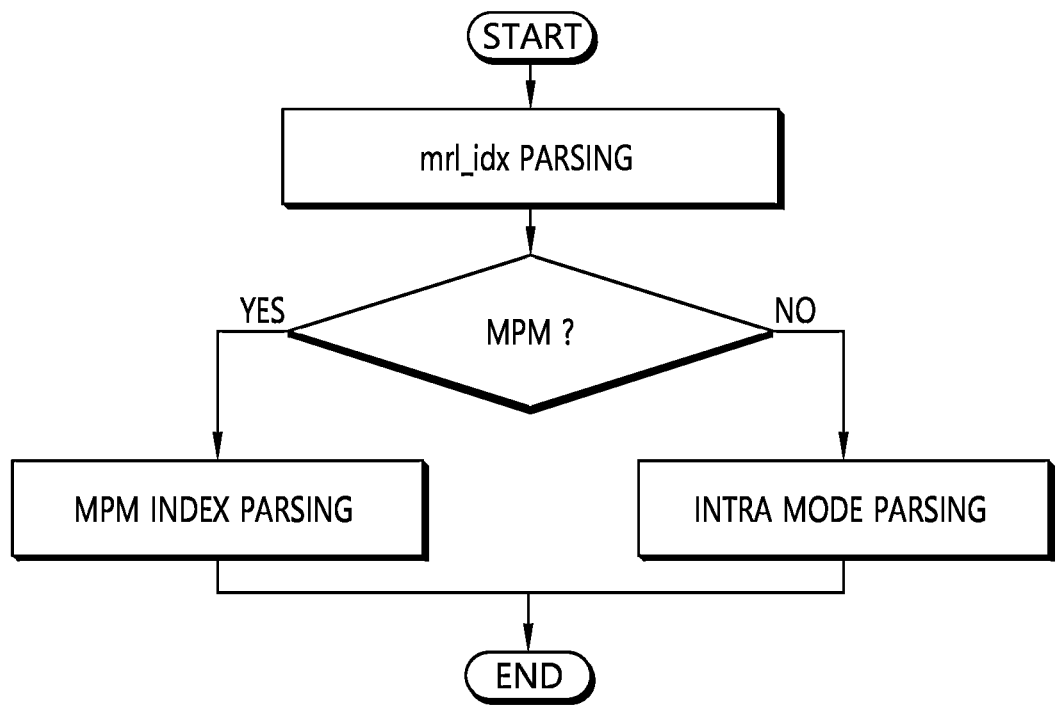
FIG. 7 schematically illustrates a parsing order in a decoding apparatus in case of using MRL intra prediction.

FIG. 7 schematically illustrates the parsing order in the decoding apparatus in case of using the MRL intra prediction.

In an embodiment, it is possible to efficiently encode the reference sample line index (mrl_idx) used for the prediction block in the MRL. The MRL intra prediction may use three reference sample lines (zeroth line, first line, and third line). Here, in an embodiment, in order to reduce the MRL encoding complexity, the MRL may not be applied to all intra prediction modes, and an optimum reference sample line may be determined by limitedly applying the MRL to the intra prediction mode configured in the MPM candidate list.

Referring to FIG. 7, the decoding apparatus may firstly parse the reference sample line index (mrl_idx) at a coding unit (CU) level, and then may parse the MPM flag (intra_luma_mpm_flag).

Here, the decoding apparatus may parse the MPM index (intra_luma_mpm_idx field) in case that the MPM is applied to the current block (e.g., in case that the intra_luma_mpm_flag field value is 1) according to the result of the MPM flag parsing. However, the decoding apparatus may parse the intra mode information in case that the MPM is not applied (i.e., in case that the intra_luma_mpm_flag field value is 0).

Here, since the intra mode information may indicate the intra prediction mode being used for the current block among remaining intra prediction modes that are not included in the MPM list, the intra mode information may be called remaining mode information, and may be represented as the intra_luma_mpm_remainder field.

The encoding apparatus may generate/configure related information to parse the related information as illustrated in FIG. 7. Specifically, after generating/configuring reference sample line index (mrl_idx) information, the encoding apparatus may generate/configure the MPM flag (intra_luma_mpm_flag), and if the MPM is applied (i.e., if the intra_luma_mpm_flag field value is 1), the encoding apparatus may generate/configure the MPM index information (intra_luma_mpm_idx). Here, earlier configuration of specific information may indicate that the decoding apparatus is configured to parse the specific information earlier on the coding unit syntax.

If the MPM is not applied (i.e., if the intra_luma_mpm_flag field value is 0), the intra mode information may be generated/configured. Here, as in the explanation of the above-described decoding apparatus, the intra mode information may refer to the remaining intra mode, and may be indicated as an intra_luma_mpm_remainder field.

Figure 8:
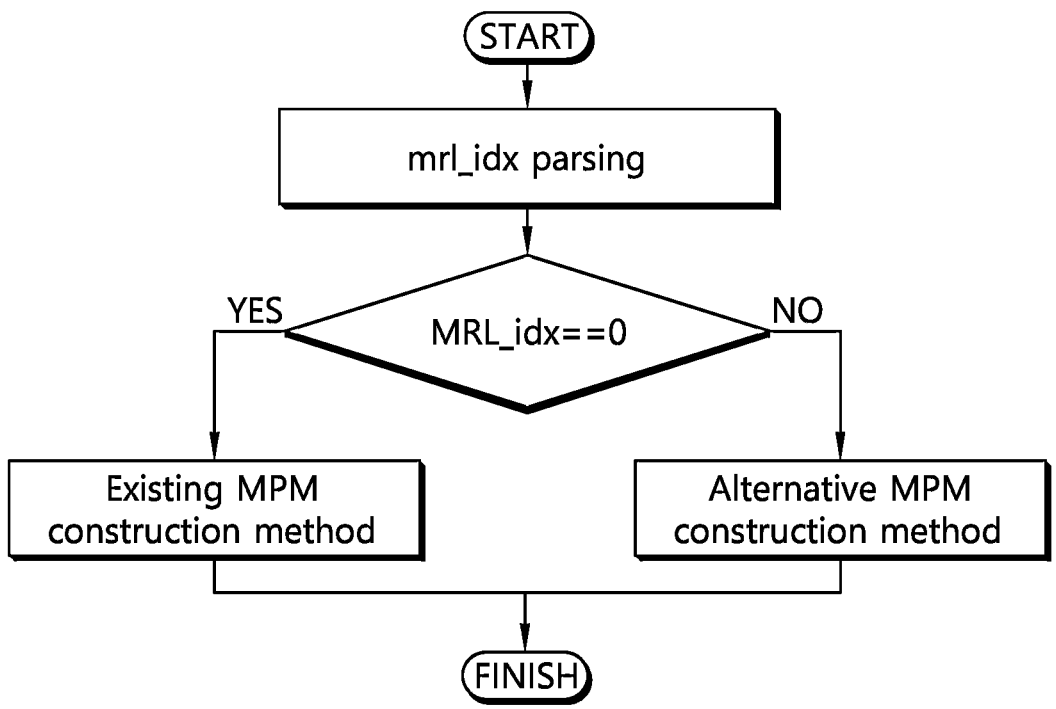
FIG. 8 schematically illustrates a method for configuring an MPM list based on a reference sample line index.

FIG. 8 schematically illustrates a method for configuring an MPM list based on a reference sample line index.

Referring to FIG. 8, the MPM or the MPM list may be differently configured according to the value of the reference sample line index (mrl_idx). For this, the reference sample line index may first be parsed.

Thereafter, in an embodiment, if the reference sample line index is 0 (i.e., if the mrl_idx field value is 0), the existing MPM construction method may be used. That is, the MPM list may be constructed using only the closest reference sample line (zeroth line). However, if the reference sample line index is not 0 (i.e., if the mrl_idx field value is not 0), the alternative MPM construction method or an alternative MPM list configuration method, which is not the existing method, may be used. Here, the case that the reference sample line index is not 0 may include a case that the reference sample line index is 1 (a case that the mrl_idx field value is 1 to indicate the first line) or a case that the reference sample line index is 2 (a case that the mrl_idx field value is 2 to indicate the third line), but is not limited thereto.

In other words, in an embodiment, a method for configuring the alternative MPM list may be used in case that the reference sample line index (mrl_idx) is not 0. If the reference sample line index is not 0, the planar mode and the DC mode are unable to be used for the intra prediction.

Accordingly, for example, the following efficient k MPM list configuration method may be used. In an embodiment, k may be 6, and 5 conditions may be used to configure 5 efficient lists.

Referring again to FIG. 5, for convenience in explanation, the intra prediction modes of the top neighboring block B and the left neighboring block A among the neighboring blocks of the current block may be denoted by L and A, respectively, and hereinafter, explanation will be made using L and A. Further, the exclamation symbol "!" may be a logical negation operator that is also called a not operator. This operator may convert a non-true value into a true value, and vice versa. For example, !7 may have a value of 0, and !0 may have a value of 1.

Hereinafter, for convenience in explanation, explanation will be made in a step-by-step manner.

First, in an embodiment, as a first step, a first condition (condition 1) whether L and A are the same as in Equation 1 may be checked. Here, in an embodiment, if the first condition is satisfied, the (2-1)-th step may be performed, whereas if the first condition is not satisfied, the (2-2)-th step may be performed.

[Equation 1]

$$L == A \quad \text{(condition 1)}$$

The (2-1)-th step refers to a case that the first condition is satisfied in the first step, and may check a second condition (condition 2) whether L is larger than DC_idx as in Equation 2. Here, the case that the second condition is satisfied may imply that L and A are all directional modes. In an embodiment, if the second condition is satisfied, the (4-1)-th step may be performed, whereas if the second condition is not satisfied, the (4-2)-th step may be performed.

[Equation 2]

$$L > DC\_idx \quad \text{(condition 2)}$$

The (2-2)-th step refers to a case that the first condition is not satisfied in the first step, and may calculate MPM indexes of larger and smaller values between L and A after construction of shared partial efficient list 1 to be described later as in Table 3. Here, the larger value may be called max_idx, and the smaller value may be called min_idx.

TABLE 3 mpm[0] = L
mpm[1] = A
If L > A, max_idx is 0 and min_idx is 1.
Otherwise, max_idx is 1 and min_idx is 0.

Thereafter, in an embodiment, a third condition (condition 3) whether L and A are all directional modes as in Equation 3 may be checked. In an embodiment, if the third condition is satisfied, the (3-1)-th step may be performed, whereas if the third condition is not satisfied, the (3-2)-th step may be performed.

[Equation 3]

$$L > DC\_idx \text{ AND } A > DC\_idx \quad \text{(condition 3)}$$

The (3-1)-th step refers to a case that the third condition is satisfied, and may check a fourth condition (condition 4) whether a difference value (diff) between L and A is smaller than 63 and is larger than 1. Here, in an embodiment, the difference value (diff) between L and A may be calculated as in Table 4, and using this, the fourth condition may be checked.

TABLE 4

| diff = mpm[max_idx] − mpm[min_idx] |
| --- |

[Equation 4]

$$diff<63 \text{ AND } diff>1 \quad \text{(condition 4)}$$

Here, in an embodiment, if one of two conditions as in Equation 5 is satisfied, the diff may be 1, and the max_idx and the min_idx may be the same.

mpm[max_idx]==66 AND mpm[min_idx]==2 mpm[max_idx]==65 AND mpm[min_idx]==2 [Equation 5]

If all the two conditions are not satisfied as in Equation 5, it may be determined whether one of four conditions is satisfied as in Equation 6, and if one of the four conditions is satisfied, the diff may be 2, and the max_idx and the min_idx may be the same.

mpm[max_idx]==66 AND mpm[min_idx]==3 mpm[max_idx]==66 AND mom[min_idx]==4 mpm[max_idx]==65 AND mom[min_idx]==3 mom[max_idx]==64 AND mpm[min_idx]==2 [Equation 6]

As described above, in an embodiment, if the diff is 1, the (4-4)-th step may be performed, and if the diff is 2, the (4-5)-th step may be performed. Otherwise, the (4-6)-th step may be performed.

The (3-2)-th step refers to a case that the third condition is not satisfied, and at least one of L and A may be a non-directional mode. Here, in an embodiment, a fifth condition (condition 5) whether only one of L or A is a non-directional mode as in Equation 7 may be checked. In an embodiment, if the fifth condition is satisfied, the (4-3)-th step may be performed, whereas if the fifth condition is not satisfied, the (4-2)-th step may be performed.

[Equation 7]

$$L+A>=2 \quad \text{(condition 5)}$$

The fourth step may be a step in which the overall MPM list or remainder of the list is constructed according to the above-described step and conditions.

The (4-1)-th step refers to a case that the second condition is satisfied, and may construct an efficient MPM list for the intra prediction of the current block as in Table 5. This may be called list 1 or efficient list 1.

TABLE 5

| mpm[0] = L |
| --- |
| mpm[1] = L − 1 |
| mpm[2] = L + 1 |
| mpm[3] = L − 2 |
| mpm[4] = L + 2 |
| mpm[5] = L − 3 |

The (4-2)-th step refers to a case that the second condition is not satisfied and a case that the fifth condition is not satisfied, and may construct an efficient MPM list for the intra prediction of the current block. This may be called list 2 or efficient list 2. In Table 6 below, Vertical_idx may denote vertical intra prediction mode or vertical intra prediction mode index (or number), and Horizontal_idx may denote horizontal intra prediction mode or horizontal intra prediction mode index (or number).

TABLE 6

| mpm[0] = Vertical_idx |
| --- |
| mpm[1] = Horizontal_idx |
| mpm[2] = 2 |
| mpm[3] = 66 |
| mpm[4] = Vertical_idx − 4 |
| mpm[5] = Vertical_idx + 4 |

The (4-3)-th step refers to a case that the fifth condition is satisfied, and may construct an efficient MPM list for the intra prediction of the current block as in Table 7. This may be called list 3 or efficient list 3.

TABLE 7

| mpm[0] = mpm[max_idx] |
| --- |
| mpm[1] = mpm[max_idx] − 1 |
| mpm[2] = mpm[max_idx] + 1 |
| mpm[3] = mpm[max_idx] − 2 |
| mpm[4] = mpm[max_idx] + 2 |
| mpm[5] = mpm[max_idx] − 3 |

The (4-4)-th step refers to a case that the diff is 1 in the (3-1)-th step, and may construct a remainder of the list as in Table 8. That is, the remainder of the MPM list may be constructed, and this may be called list 4.

TABLE 8

| mpm[2] = mpm[max_idx] + 1 |
| --- |
| mpm[3] = mpm[!max_idx] − 1 |
| mpm[4] = mpm[max_idx] + 2 |
| mpm[5] = mpm[!max_idx] − 2 |

The (4-5)-th step refers to a case that the diff is 2 in the (3-1)-th step, and may construct a remainder of the list as in Table 9. That is, the remainder of the MPM list may be constructed, and this may be called list 5.

TABLE 9

| mpm[2] = mpm[max_idx] − 1 |
| --- |
| mpm[3] = mpm[max_idx] + 1 |
| mpm[4] = mpm[!max_idx] − 1 |
| mpm[5] = mpm[max_idx] + 2 |

The (4-6)-th step refers to a case that the diff is not 1 or 2 in the (3-1)-th step, and may construct a remainder of the list as in Table 10. That is, the remainder of the MPM list may be constructed, and this may be called list 6.

TABLE 10

| mpm[2] = mpm[max_idx] − 1 |
| --- |
| mpm[3] = mpm[max_idx] + 1 |
| mpm[4] = mpm[!max_idx] − 1 |
| mpm[5] = mpm[!max_idx] + 1 |

In other words, the list constructed in the (4-4)-th step, the (4-5)-th step, and the (4-6)_th step may include information on four candidates as a remaining list, and the MPM list may be constructed together with the partial list of Table 3, that is, information on two candidates.

In the fourth step, directional intra mode +1, directional intra mode −1 and directional intra mode −2 may not be a simple method for simply mathematically adding or subtracting. In a specific case, by subtracting or adding directional modes, any one may become a non-directional mode which breaks the consistency of the neighbor intra mode. Further, any one may exceed the maximum available intra mode index. For example, directional intra mode −1 may cause intra mode 1 that is the DC index. Adding +1 to intra mode 66 may cause 67 that exceeds the maximum available intra mode 66. Accordingly, the boundary or range of adding and subtracting using modular arithmetic, which is denoted as % as in Table 11, may be limited.

TABLE 11

Intra mode − 1 -> (Intra mode + 61)% 64 + 2
Intra mode + 1 -> (Intra mode − 1)% 64 + 2
Intra mode − 2 -> (Intra mode + 60)% 64 + 2
Intra mode + 2 -> (Intra mode)% 64 + 2

In an embodiment, the encoding apparatus may determine whether an optimum intra prediction mode to be applied to the current block is included in MPM candidates (or MPM list or MPM candidate list) configured (or generated) according to the above-described method. If the optimum intra prediction mode to be applied to the current block is included in the MPM candidate list, the encoding apparatus may encode an MPM flag and an MPM index. That is, the encoding apparatus can encode image information including information on the MPM flag and information on the MPM index. Here, the MPM flag may indicate whether the intra prediction mode of the current block is included in the MPM candidate list. Further, the MPM index may indicate which MPM candidate or MPM mode is applied (or used) as the intra prediction mode of the current block in the MPM candidate list. In contrast, if the optimum intra prediction mode of the current block is not included in the MPM candidate list, the encoding apparatus may encode the intra prediction mode of the current block. That is, the encoding apparatus may encode image information including information on the intra prediction mode.

The decoding apparatus may configure the MPM candidates (or MPM list or MPM candidate list) according to the above-described method in the same manner as the encoding apparatus. In addition, the decoding apparatus may check whether the intra prediction mode being applied to the current block is included in the MPM candidates using the MPM flag received from the encoding apparatus. That is, the decoding apparatus may obtain information on the MPM flag by parsing a bitstream obtained from the encoding apparatus, and based on this, the decoding apparatus may check whether the intra prediction mode being applied to the current block is included in the MPM candidate list. If the intra prediction mode being applied to the current block is included in the MPM candidate list, the decoding apparatus may induce (or determine) the intra prediction mode being applied to the current block using the MPM index obtained from the encoding apparatus. In contrast, if the intra prediction mode being applied to the current block is not included in the MPM candidates, the decoding apparatus may induce the intra prediction mode being applied to the current block using the prediction mode index (or remaining prediction mode index) indicating a specific prediction mode among the remaining prediction modes excluding the MPM candidates. That is, the decoding apparatus may determine the intra prediction mode being applied to the current block using the above-described remaining intra prediction mode information.

Figure 9:
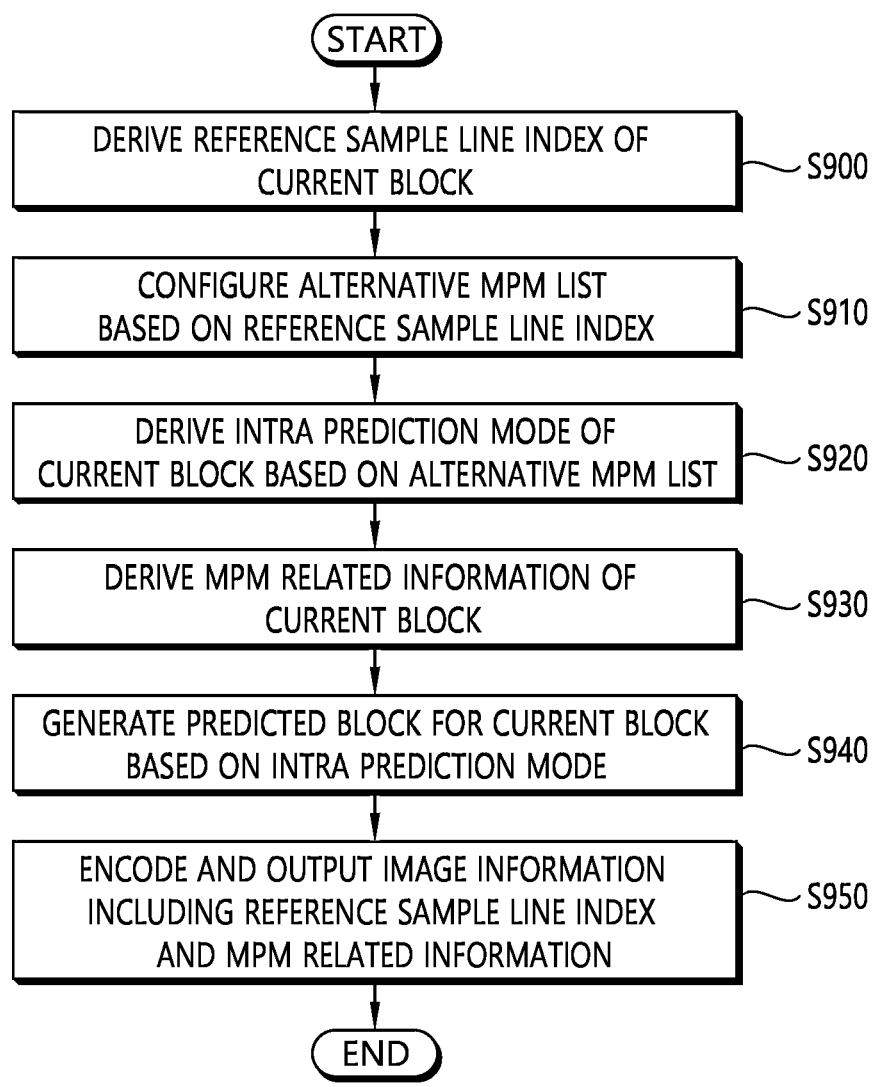
FIG. 9 schematically illustrates an image encoding method performed by an encoding apparatus according to the present disclosure.

FIG. 9 schematically illustrating an image encoding method by an encoding apparatus according to the present disclosure.

The method disclosed in FIG. 9 may be performed by the encoding apparatus disclosed in FIG. 2. Specifically, for example, S900 to S940 of FIG. 9 may be performed by the predictor of the encoding apparatus, and S950 may be performed by the entropy encoder of the encoding apparatus. Further, although not illustrated, a process for deriving a residual sample for the current block based on the original sample for the current block and the prediction sample may be performed by the subtractor of the encoding apparatus, and a process for generating information on the residual for the current block based on the residual sample may be performed by the transformer of the encoding apparatus. A process for encoding information on the residual and information on prediction of the current block may be performed by the entropy encoder of the encoding apparatus.

The encoding apparatus derives the reference sample line index of the current block (S900). The reference sample line index may indicate a line to be used for intra prediction of a coding unit. The reference sample line index may be represented as an mrl_idx field, and may also be represented as intra_luma_ref_idx field or an intra_luma_ref_line_idx field. The intra_luma_ref_idx field value may be 0, 1, and 2, and thus it can indicate line 0, line 1, and line 3. The reference sample line index may be included in coding unit syntax.

The encoding apparatus configures an alternative MPM list based on the reference sample line index (S910). For example, if the reference sample line index is 0, the existing MPM construction method may be used. Further, if the reference sample line index is not 0, the alternative MPM construction method may be used.

For example, the alternative MPM list may be configured based on the intra prediction mode of a top neighboring block of the current block and the intra prediction mode of a left neighboring block of the current block, and may be configured as one of 6 kinds of MPM lists through the first to fourth steps as described above with reference to FIG. 8. The 6 kinds of MPM lists may be as follows.

For example, as shown in Table 5, the alternative MPM list may include the intra prediction mode (L) of the top neighboring block, intra prediction mode of which the number is increased by −1 (L−1) based on the number of the intra prediction mode of the top neighboring block, intra prediction mode of which the number is increased by +1 (L+1) based on the number of the intra prediction mode of the top neighboring block, intra prediction mode of which the number is increased by −2 (L−2) based on the number of the intra prediction mode of the top neighboring block, intra prediction mode of which the number is increased by +2 (L+2) based on the number of the intra prediction mode of the top neighboring block, and intra prediction mode of which the number is increased by −3 (L−3) based on the number of the intra prediction mode of the top neighboring block.

For example, as shown in Table 6, the alternative MPM list may include vertical intra prediction mode (vertical_idx), horizontal intra prediction mode (horizontal_idx), No. 2 intra prediction mode (2), No. 66 intra prediction mode (66), intra prediction mode of which the number is increased by −4 (vertical_idx−4) based on the vertical intra prediction mode, and intra prediction mode of which the number is increased by +4 (vertical_idx+4) based on the vertical intra prediction mode.

For example, as shown in Table 3, the intra prediction mode (L) of the top neighboring block may be set to candidate No. 0 (mpm[0]), and the intra prediction mode (A) of the left neighboring block may be set to candidate No. 1 (mpm[1]). If the number of the intra prediction mode of the top neighboring block is larger than the number of the intra prediction mode of the left neighboring block, the maximum index value (max_idx) may be set to 0, and the minimum index value (min_idx) may be set to 1. If the number of the intra prediction mode of the top neighboring block is not larger than the number of the intra prediction mode of the left neighboring block, the maximum index value (max_idx) may be set to 1, and the minimum index value (min_idx) may be set to 0. Here, if not operator is attached to the maximum index value (!max_idx), it may represent an opposite value, and may represent the minimum index value.

For example, based on the above-described configuration as shown in Table 7, the alternative MPM list may include an intra prediction mode (mpm[max_idx]) having the maximum index value as the candidate number, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −2 (mpm[max_idx]−2) based on the number of the intra prediction mode having the maximum index value as the candidate number, intra prediction mode of which the number is increased by +2 (mpm[max_idx]+2) based on the number of the intra prediction mode having the maximum index value as the candidate number, and intra prediction mode of which the number is increased by −3 (mpm[max_idx]−3) based on the number of the intra prediction mode having the maximum index value as the candidate number.

For example, based on the above-described configuration as shown in Table 8, the alternative MPM list may include the intra prediction mode (L) of the top neighboring block, the intra prediction mode (A) of the left neighboring block, intra prediction mode of which the number is increased by +1 (mpm[max_idx]+1) based on the number of the intra prediction mode having the maximum index value as the candidate number, intra prediction mode of which the number is increased by −1 (mpm[!max_idx]−1) based on the number of the intra prediction mode having the minimum index value as the candidate number, intra prediction mode of which the number is increased by +2 (mpm[max_idx]+2) based on the number of the intra prediction mode having the maximum index value as the candidate number, and intra prediction mode of which the number is increased by −2 (mpm[!max_idx]−2) based on the number of the intra prediction mode having the minimum index value as the candidate number.

For example, based on the above-described configuration as shown in Table 9, the alternative MPM list may include the intra prediction mode (L) of the top neighboring block, the intra prediction mode (A) of the left neighboring block, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −1 (mpm[!max_idx]−1 based on the number of the intra prediction mode having the minimum index value as the candidate number, and intra prediction mode of which the number is increased by +2 (mpm[max_idx]+2) based on the number of the intra prediction mode having the maximum index value as the candidate number.

For example, based on the above-described configuration as shown in Table 10, the alternative MPM list may include the intra prediction mode (L) of the top neighboring block, the intra prediction mode (A) of the left neighboring block, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −1 (mpm[!max_idex]−1) based on the number of the intra prediction mode having the minimum index value as the candidate number, and intra prediction mode of which the number is increased by +1 (mpm[!max_idx]+1) based on the number of the intra prediction mode having the minimum index value as the candidate number.

The encoding apparatus derives the intra prediction mode of the current block based on the alternative MPM list (S920). That is, the encoding apparatus may derive the intra prediction mode for prediction of the current block among candidates in the alternative MPM list. Further, the encoding apparatus may select a candidate for the prediction of the current block among the candidates in the MPM list, and may derive the intra prediction mode of the selected candidate.

The encoding apparatus derives MPM related information of the current block (S930). The MPM related information may include an MPM flag (intra_luma_mpm_flag) indicating whether the alternative MPM list includes the intra prediction mode of the current block and an MPM index (intra_luma_mpm_idx) for information indicating the intra prediction mode of the current block in the alternative MPM list. Here, the MPM related information may be included in the coding unit syntax.

For example, if the MPM flag value is 1, the intra prediction mode of the current block may be derived based on the alternative MPM list and the MPM index. That is, it may be indicated that the intra prediction mode of the current block is included in the alternative MPM list by the MPM flag, and a specific candidate may be indicated as the intra prediction mode of the current block in the MPM list by the MPM index.

For example, if the MPM flag value is 0, the intra prediction mode of the current block may be derived based on the remaining intra prediction modes excluding the intra prediction modes included in the alternative MPM list among all available intra prediction modes. That is, it may be indicated that the intra prediction mode of the current block is not included in the alternative MPM list by the MPM flag, and the intra prediction mode of the current block may be derived based on the remaining intra prediction modes without using the MPM index. Information on the remaining intra prediction modes may be indicated as an intra_luma_mpm_remainder field.

The encoding apparatus generates a predicted block for the current block based on the intra prediction mode (S940). Here, the derived intra prediction mode may be a directional mode or a non-directional mode. The encoding apparatus may generate prediction samples based on the intra prediction mode, and may immediately use the prediction samples as reconstructed samples according to the prediction mode. Further, the encoding apparatus may generate residual samples based on the original samples and the generated prediction samples. The encoding apparatus may generate information on the residual based on the residual samples. The information on the residual may include transform coefficients for the residual samples. The encoding apparatus may derive the reconstructed samples based on the prediction samples and the residual samples. That is, the encoding apparatus may derive the reconstructed samples by adding the prediction samples and the residual samples to each other. Here, the encoding apparatus may generate a residual block based on the original block and the predicted block, and based on this, the encoding apparatus may generate information on the residual.

The encoding apparatus encodes and outputs image information including the reference sample line index and the MPM related information (S950). That is, the encoding apparatus may encode the image information and output the image information in the form of a bitstream. For example, the encoding apparatus may determine the prediction mode of the current block, and generate information representing the prediction mode. Further, the encoding apparatus may generate the reference sample line index and the MPM related information. Further, the encoding apparatus may generate information on the residual. The encoding apparatus may encode and output the image information including all or part of the above-described information in the form of a bitstream, and the bitstream may be transmitted to the decoding apparatus through a network or a storage media.

Figure 10:
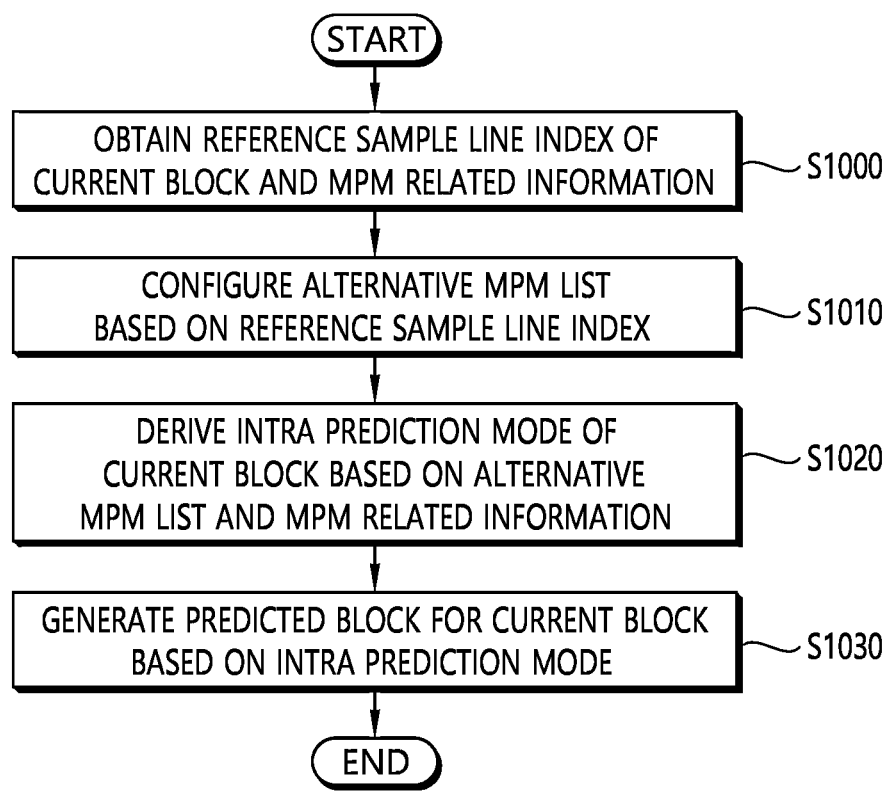
FIG. 10 schematically illustrates an image decoding method performed by a decoding apparatus according to the present disclosure.

FIG. 10 schematically illustrates an image decoding method by a decoding apparatus according to the present disclosure.

The method disclosed in FIG. 10 may be performed by the decoding apparatus disclosed in FIG. 3. Specifically, for example, S1000 to S1030 of FIG. 10 may be performed by the predictor of the decoding apparatus. Further, although not illustrated, a process for obtaining image information including information on prediction of the current block and information on residual through a bitstream may be performed by the entropy decoder of the decoding apparatus, and a process for deriving the residual sample for the current block based on the residual information may be performed by the inverse transformer of the decoding apparatus. A process for generating a reconstructed picture based on the prediction samples and the residual samples may be performed by the adder of the decoding apparatus.

The decoding apparatus obtains the reference sample line index of the current block and the MPM related information (S1000). The reference sample line index may indicate a line to be used for intra prediction of a coding unit. The reference sample line index may be represented as an mrl_idx field, and may also be represented as intra_luma_ref_idx field or an intra_luma_ref_line_idx field. The intra_luma_ref_idx field value may be 0, 1, and 2, and thus it can indicate line 0, line 1, and line 3. The reference sample line index may be included in coding unit syntax.

The decoding apparatus configures an alternative MPM list based on the reference sample line index (S1010). For example, if the reference sample line index is 0, the existing MPM construction method may be used. Further, if the reference sample line index is not 0, the alternative MPM construction method may be used.

For example, the alternative MPM list may be configured based on the intra prediction mode of a top neighboring block of the current block and the intra prediction mode of a left neighboring block of the current block, and may be configured as one of 6 kinds of MPM lists through the first to fourth steps as described above with reference to FIG. 8. The 6 kinds of MPM lists may be as follows.

For example, as shown in Table 5, the alternative MPM list may include the intra prediction mode (L) of the top neighboring block, intra prediction mode of which the number is increased by −1 (L−1) based on the number of the intra prediction mode of the top neighboring block, intra prediction mode of which the number is increased by +1 (L+1) based on the number of the intra prediction mode of the top neighboring block, intra prediction mode of which the number is increased by −2 (L−2) based on the number of the intra prediction mode of the top neighboring block, intra prediction mode of which the number is increased by +2 (L+2) based on the number of the intra prediction mode of the top neighboring block, and intra prediction mode of which the number is increased by −3 (L−3) based on the number of the intra prediction mode of the top neighboring block.

For example, as shown in Table 6, the alternative MPM list may include vertical intra prediction mode (vertical_idx), horizontal intra prediction mode (horizontal_idx), No. 2 intra prediction mode (2), No. 66 intra prediction mode (66), intra prediction mode of which the number is increased by −4 (vertical_idx−4) based on the vertical intra prediction mode, and intra prediction mode of which the number is increased by +4 (vertical_idx+4) based on the vertical intra prediction mode.

For example, as shown in Table 3, the intra prediction mode (L) of the top neighboring block may be set to candidate No. 0 (mpm[0]), and the intra prediction mode (A) of the left neighboring block may be set to candidate No. 1 (mpm[1]). If the number of the intra prediction mode of the top neighboring block is larger than the number of the intra prediction mode of the left neighboring block, the maximum index value (max_idx) may be set to 0, and the minimum index value (min_idx) may be set to 1. If the number of the intra prediction mode of the top neighboring block is not larger than the number of the intra prediction mode of the left neighboring block, the maximum index value (max_idx) may be set to 1, and the minimum index value (min_idx) may be set to 0. Here, if not operator is attached to the maximum index value (!max_idx), it may represent an opposite value, and may represent the minimum index value.

For example, based on the above-described configuration as shown in Table 7, the alternative MPM list may include an intra prediction mode (mpm[max_idx]) having the maximum index value as the candidate number, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −2 (mpm[max_idx]−2) based on the number of the intra prediction mode having the maximum index value as the candidate number, intra prediction mode of which the number is increased by +2 (mpm[max_idx]+2) based on the number of the intra prediction mode having the maximum index value as the candidate number, and intra prediction mode of which the number is increased by −3 (mpm[max_idx]−3) based on the number of the intra prediction mode having the maximum index value as the candidate number.

For example, based on the above-described configuration as shown in Table 8, the alternative MPM list may include the intra prediction mode (L) of the top neighboring block, the intra prediction mode (A) of the left neighboring block, intra prediction mode of which the number is increased by +1 (mpm[max_idx]+1) based on the number of the intra prediction mode having the maximum index value as the candidate number, intra prediction mode of which the number is increased by −1 (mpm[!max_idx]−1) based on the number of the intra prediction mode having the minimum index value as the candidate number, intra prediction mode of which the number is increased by +2 (mpm[max_idx]+2) based on the number of the intra prediction mode having the maximum index value as the candidate number, and intra prediction mode of which the number is increased by −2 (mpm[!max_idx]−2) based on the number of the intra prediction mode having the minimum index value as the candidate number.

For example, based on the above-described configuration as shown in Table 9, the alternative MPM list may include the intra prediction mode (L) of the top neighboring block, the intra prediction mode (A) of the left neighboring block, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −1 (mpm[!max_idx]−1 based on the number of the intra prediction mode having the minimum index value as the candidate number, and intra prediction mode of which the number is increased by +2 (mpm[max_idx]+2) based on the number of the intra prediction mode having the maximum index value as the candidate number.

For example, based on the above-described configuration as shown in Table 10, the alternative MPM list may include the intra prediction mode (L) of the top neighboring block, the intra prediction mode (A) of the left neighboring block, intra prediction mode of which the number is increased by −1 (mpm[max_idx]−1) based on the number of the intra prediction mode having the maximum index value as the candidate number, intra prediction mode of which the number is increased by +1 (mpm[max_idx]+1) based on the number of the intra prediction mode having the maximum index value as the candidate number, intra prediction mode of which the number is increased by −1 (mpm[!max_idex]−1) based on the number of the intra prediction mode having the minimum index value as the candidate number, and intra prediction mode of which the number is increased by +1 (mpm[!max_idx]+1) based on the number of the intra prediction mode having the minimum index value as the candidate number.

The decoding apparatus derives the intra prediction mode of the current block based on the alternative MPM list and the MPM related information (S1020). That is, the decoding apparatus may derive the intra prediction mode for prediction of the current block among candidates in the alternative MPM list. Further, the decoding apparatus may select a candidate for the prediction of the current block among the candidates in the MPM list, and may derive the intra prediction mode of the selected candidate.

The MPM related information may include an MPM flag (intra_luma_mpm_flag) indicating whether the alternative MPM list includes the intra prediction mode of the current block and an MPM index (intra_luma_mpm_idx) for information indicating the intra prediction mode of the current block in the alternative MPM list. Here, the MPM related information may be included in the coding unit syntax.

For example, if the MPM flag value is 1, the intra prediction mode of the current block may be derived based on the alternative MPM list and the MPM index. That is, it may be indicated that the intra prediction mode of the current block is included in the alternative MPM list by the MPM flag, and a specific candidate may be indicated as the intra prediction mode of the current block in the MPM list by the MPM index.

For example, if the MPM flag value is 0, the intra prediction mode of the current block may be derived based on the remaining intra prediction modes excluding the intra prediction modes included in the alternative MPM list among all available intra prediction modes. That is, it may be indicated that the intra prediction mode of the current block is not included in the alternative MPM list by the MPM flag, and the intra prediction mode of the current block may be derived based on the remaining intra prediction modes without using the MPM index. Information on the remaining intra prediction modes may be indicated as an intra_luma_mpm_remainder field.

The decoding apparatus generates a predicted block for the current block based on the intra prediction mode (S1030). Here, the derived intra prediction mode may be a directional mode or a non-directional mode. The decoding apparatus may generate prediction samples based on the intra prediction mode, and may immediately use the prediction samples as reconstructed samples according to the prediction mode. Further, the decoding apparatus may generate the reconstructed samples by adding the residual samples to the prediction samples. If the residual sample for the current block exists, the decoding apparatus may obtain information on the residual for the current block from the bitstream. The information on the residual may include transform coefficients for the residual samples. The decoding apparatus may derive the residual samples (or residual sample array) for the current block based on the residual information. The decoding apparatus may generate residual samples based on the prediction samples and the residual samples, and derive a reconstructed block or a reconstructed picture based on the reconstructed samples. Thereafter, as needed, the decoding apparatus may apply deblocking filtering and/or in-loop filtering procedures, such as SAO procedure, to the reconstructed picture in order to improve the subjective/objective picture quality as described above.

In the above-described embodiments, methods are described based on a flowchart using a series of steps or blocks, but the present disclosure is not limited to the sequence of the steps. Some steps may be generated simultaneously or in a different sequence from the steps described above. Further, those skilled in the art will understand that the steps shown in the flowchart diagram are not exclusive, other steps may be included, or one or more steps in the flowchart may be deleted without affecting the scope of this document.

The method according to the present disclosure described above may be implemented in a software form, and the encoding apparatus and/or the decoding apparatus according to the present disclosure may be included, for example, in a device that performs image processing, such as TV, computer, smartphone, set-top box, or display device.

When the embodiments of the present disclosure are implemented in software, the above-described method may be implemented by modules (processes, functions, and so on) that perform the functions described above. Such modules may be stored in memory and executed by a processor. The memory may be inside or outside the processor, and the memory may be connected to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage devices.

Figure 11:
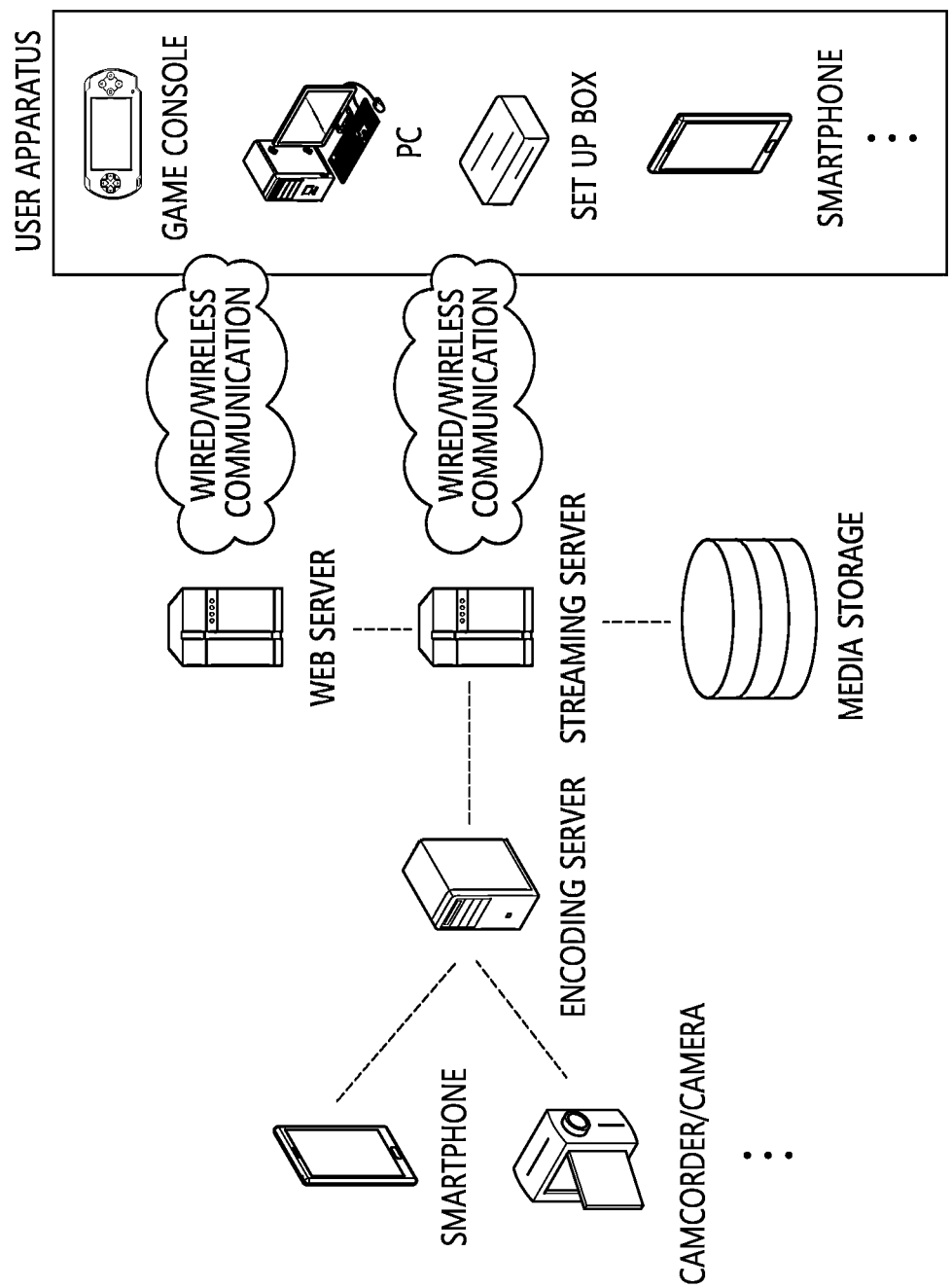
FIG. 11 schematically illustrates a content streaming system structure.

FIG. 11 is a diagram illustrating a structure of a content streaming system.

That is, the exemplary embodiments described in the present disclosure may be performed by being implemented on a processor, a microprocessor, a controller, or a chip. For example, the functional units illustrated in each drawing may be performed by being implemented on a computer, a processor, a microprocessor, a controller, or a chip.

Further, the decoding apparatus and the encoding apparatus to which the present disclosure is applied may be included in a multimedia broadcast transceiver, a mobile communication terminal, a home cinema video device, a digital cinema video device, a surveillance camera, a video chat device, a real-time communication device such as video communication, a mobile streaming device, a storage medium, a camcorder, a Video on Demand (VoD) service provider, an Over the top (OTT) video device, an Internet streaming service provider, a three-dimensional (3D) video device, a video call video device, a medical video device, or the like, and used for processing video signals or data signals. For example, the Over the top (OTT) video device may include a game console, a Blue-ray player, an Internet access TV, a home theater system, a smartphone, a tablet PC, a digital video recorder (DVR), and the like.

Further, the processing method to which the present disclosure is applied may be produced in the form of a program executed by a computer, and stored in a computer-readable recording medium. The multimedia data having the data structure according to the present disclosure may also be stored in the computer-readable recording medium. The computer-readable recording medium includes all kinds of storage devices and distribution storage devices in which the computer-readable data are stored. The computer-readable recording medium may include, for example, a Blue-ray disc (BD), a universal serial bus (USB), a ROM, a PROM, an EPROM, an EEPROM, a RAM, a CD-ROM, a magnetic tape, a floppy disc, and an optical data storage device. Further, the computer-readable recording medium includes a media implemented in the form of a carrier (e.g., transmission through the Internet). Further, the bitstream generated by the encoding method may be stored in the computer-readable recording medium or transmitted through a wired/wireless communication network. Further, the exemplary embodiment of the present disclosure may be implemented by a computer program product by program codes, and the program codes may be performed by the computer according to the exemplary embodiment of the present disclosure. The program codes may be stored on the computer-readable carrier.

Further, the content streaming system to which the present disclosure is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted. The bitstream may be generated by the encoding method to which the present disclosure is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smartwatch, a smart glass, a head mounted display (HMD)), a digital TV, a desktop computer, a digital signage, or the like. The respective servers within the content streaming system may be operated by a distribution server, and in this case, the data received by each server may be distributed and processed.

What is claimed is:

1. A decoding apparatus for an image decoding, the decoding apparatus comprising:
    a memory; and
    at least one processor connected to the memory, the at least one processor configured to:
    obtain image information including prediction related information, information on a reference sample line index and most probable mode (MPM) related information of a current block through a bitstream;
    determine that an intra prediction is applied for the current block based on the prediction related information;
    configure an MPM list for the current block;
    derive an intra prediction mode of the current block based on the MPM list and the MPM related information;
    derive reference neighboring samples based on the information on the reference sample line index;
    generate a predicted block for the current block based on the intra prediction mode and the reference neighboring samples; and
    generate a reconstructed picture based on the predicted block,
    wherein the MPM list is configured based on a first intra prediction mode of a left neighboring block of the current block and a second intra prediction mode of a top neighboring block of the current block,
    wherein the MPM list comprise a first MPM candidate, a second MPM candidate, a third MPM candidate, a fourth MPM candidate and a fifth MPM candidate,
    wherein based on a case that a mode value of the first intra prediction mode is equal to a mode value of the second intra prediction mode and the mode value of the first intra prediction mode is greater than a mode value of a DC mode, a mode value of the first MPM candidate is equal to the mode value of the first intra prediction mode, a mode value of the second MPM candidate is equal to a result of an equation of (L+61)%64+2, L being the mode value of the first intra prediction mode, a mode value of the third MPM candidate is equal to a result of an equation of (L−1)%64+2, a mode value of the fourth MPM candidate is equal to a result of an equation of (L+60) % 64+2, and a mode value of the fifth MPM candidate is equal to a result of an equation of (L) % 64+2.

2. An encoding apparatus for an image encoding, the encoding apparatus comprising:

a memory; and at least one processor connected to the memory, the at least one processor configured to:

determine that an intra prediction is applied for a current block;

generate prediction related information;

derive a reference sample line index of the current block;

generate information on the reference sample line index;

configure a most probable mode (MPM) list for the current block;

derive an intra prediction mode of the current block based on the MPM list;

generate MPM related information of the current block; and generate a bitstream by encoding image information including the prediction related information, the information on the reference sample line index and the MPM related information, wherein the MPM list is configured based on a first intra prediction mode of a left neighboring block of the current block and a second intra prediction mode of a top neighboring block of the current block, wherein the MPM list comprise a first MPM candidate, a second MPM candidate, a third MPM candidate, a fourth MPM candidate and a fifth MPM candidate, wherein based on a case that a mode value of the first intra prediction mode is equal to a mode value of the second intra prediction mode and the mode value of the first intra prediction mode is greater than a mode value of a DC mode, a mode value of the first MPM candidate is equal to the mode value of the first intra prediction mode, a mode value of the second MPM candidate is equal to a result of an equation of (L+61)%64+2, L being the mode value of the first intra prediction mode, a mode value of the third MPM candidate is equal to a result of an equation of (L−1)%64+2, a mode value of the fourth MPM candidate is equal to a result of an equation of (L+60) % 64+2, and a mode value of the fifth MPM candidate is equal to a result of an equation of (L) % 64+2.

3. An apparatus for transmitting data for an image, the apparatus comprising:

at least one processor configured to obtain a bitstream for the image, wherein the bitstream is generated based on determining that an intra prediction is applied for a current block, generating prediction related information, deriving a reference sample line index of a current block, generating information on the reference sample line index, configuring a most probable mode (MPM) list for the current block, deriving an intra prediction mode of the current block based on the MPM list, generating MPM related information of the current block and generating the bitstream by encoding image information including the prediction related information, the information on the reference sample line index and the MPM related information; and a transmitter configured to transmit the data comprising the bitstream, wherein the MPM list is configured based on a first intra prediction mode of a left neighboring block of the current block and a second intra prediction mode of a top neighboring block of the current block, wherein the MPM list comprise a first MPM candidate, a second MPM candidate, a third MPM candidate, a fourth MPM candidate and a fifth MPM candidate, wherein based on a case that a mode value of the first intra prediction mode is equal to a mode value of the second intra prediction mode and the mode value of the first intra prediction mode is greater than a mode value of a DC mode, a mode value of the first MPM candidate is equal to the mode value of the first intra prediction mode, a mode value of the second MPM candidate is equal to a result of an equation of (L+61)%64+2, L being the mode value of the first intra prediction mode, a mode value of the third MPM candidate is equal to a result of an equation of (L−1)%64+2, a mode value of the fourth MPM candidate is equal to a result of an equation of (L+60) % 64+2, and a mode value of the fifth MPM candidate is equal to a result of an equation of (L) % 64+2.

* * * * *